(12) United States Patent
Noda

(10) Patent No.: US 7,058,962 B2
(45) Date of Patent: Jun. 6, 2006

(54) INFORMATION RECORDING MEDIUM, LABEL FOR AN INFORMATION RECORDING MEDIUM AND METHOD OF ADHERING A LABEL FOR AN INFORMATION RECORDING MEDIUM

(75) Inventor: Toyokazu Noda, Tokyo (JP)

(73) Assignee: Sony Corporation (JP)

( * ) Notice: Subject to any disclaimer, the term of this patent is extended or adjusted under 35 U.S.C. 154(b) by 225 days.

(21) Appl. No.: 10/733,494

(22) Filed: Dec. 11, 2003

(65) Prior Publication Data
US 2004/0139458 A1    Jul. 15, 2004

(30) Foreign Application Priority Data
Jan. 14, 2003  (JP) .......................... P2003-006302

(51) Int. Cl.
*G11B 3/70* (2006.01)

(52) U.S. Cl. ....................................... 720/718
(58) Field of Classification Search ................. 720/718
See application file for complete search history.

(56) References Cited

U.S. PATENT DOCUMENTS

| | | | | |
|---|---|---|---|---|
| 5,799,982 A | * | 9/1998 | McClure et al. | 283/81 |
| 5,902,446 A | * | 5/1999 | Casillo et al. | 156/379.8 |
| 5,925,200 A | * | 7/1999 | Grossman | 156/60 |
| 6,321,814 B1 | * | 11/2001 | Tracy et al. | 156/556 |
| 6,463,026 B1 | * | 10/2002 | Anderson | 720/719 |

* cited by examiner

*Primary Examiner*—William Klimowicz
*Assistant Examiner*—Mark Blouin
(74) *Attorney, Agent, or Firm*—Lerner, David, Littenberg, Krumholz & Mentlik, LLP

(57) ABSTRACT

An information recording medium, such as a disc, is provided from which data can be read in a stable fashion even when a label for the information recording medium is adhered thereon. A label is partially attached to the information recording member in which an information recording layer is formed on a substrate, on a label surface opposite the substrate. The so-called partial attachment involves attaching the label to the disc at only a few selected points and not to the entire disc surface.

11 Claims, 7 Drawing Sheets

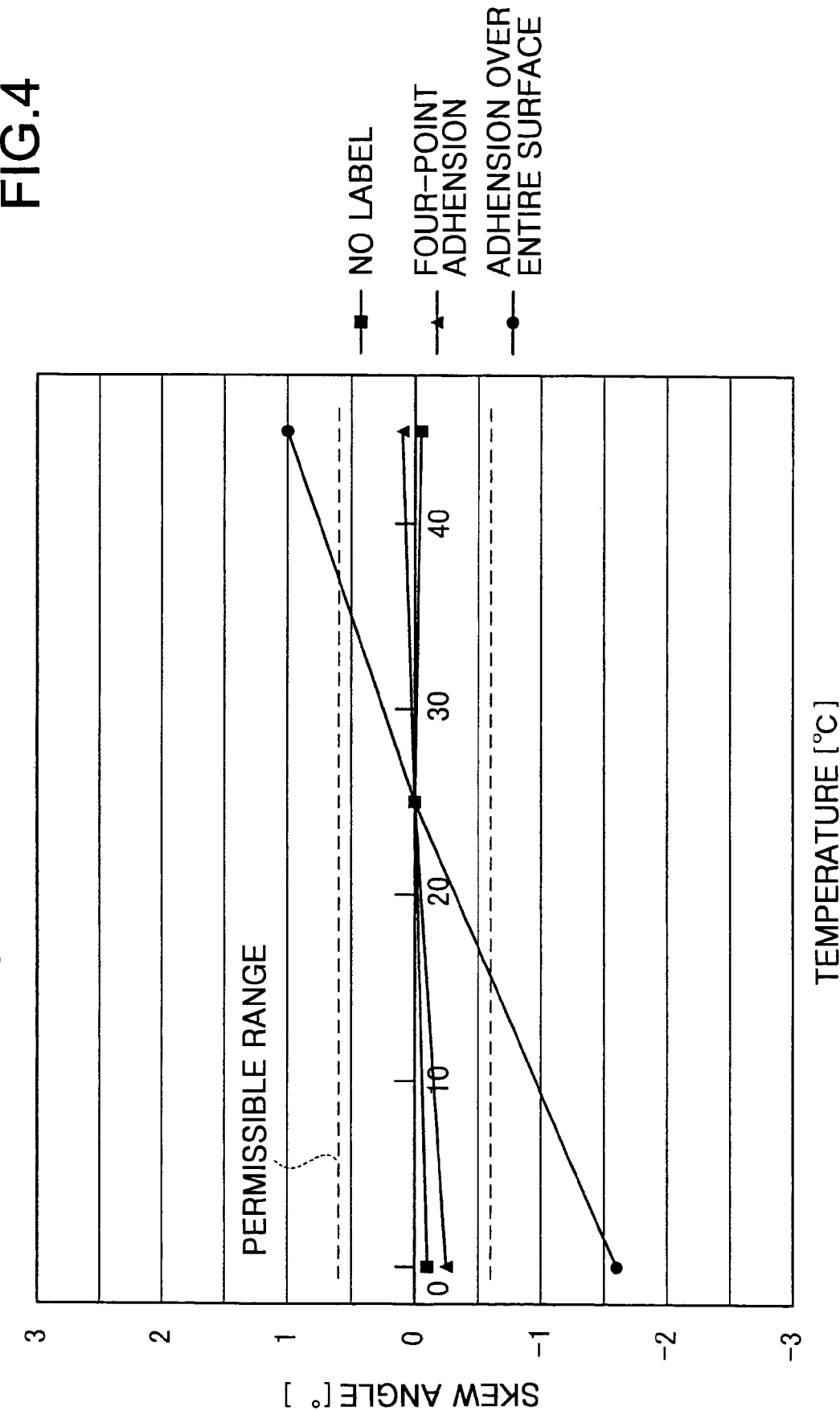

INFORMATION RECORDING MEDIUM, LABEL FOR AN INFORMATION RECORDING MEDIUM AND METHOD OF ADHERING A LABEL FOR AN INFORMATION RECORDING MEDIUM

CROSS REFERENCE TO RELATED APPLICATIONS

The present document claims priority to Japanese Priority Document JP 2003-006302, filed in the Japanese Patent Office on Jan. 14, 2003, the entire contents of which are incorporated herein by reference to the extent permitted by law.

BACKGROUND OF THE INVENTION

1. Field of the Invention

The present invention relates to an information recording medium such as a CD or CD-R, and more specifically to an information recording medium to which a label having text and images printed thereon is adhered.

2. Description of the Related Art

As disc-shaped recording media, CD-ROMs (Compact Disc Read Only Memory), CD-Rs (Compact Disc Recordable), CD-RWs (Compact Disc Rewritable), and the like have conventionally been known. CD-ROM is a read-only information recording medium, CD-R is a CD to which recording can be performed once, and CD-RW is a rewritable CD.

CD-ROMs are usually shipped with indexes such as the recorded content, its title and the like printed directly by the manufacturer on the surface opposite the surface from which data is read. However, in the case of CD-Rs and CD-RWs on which users can record data, there are cases where the user prints information such as the recorded content and title, and further, image data such as graphics and photographs on a label, and adheres the label onto the CD-R, for example, with an adhesive. The same applies to DVDs (Digital Versatile Disc).

As related art, there exists a method in which a label is positioned in relation to a positioning sheet placed inside a recess and brought into close contact with the positioning sheet. The label has a transparent film layer on which an image is printed, an adhesive layer, and a release sheet that are layered. After the release sheet is peeled off to expose the adhesive layer, a recording medium is fit inside the recess, and the label is adhered onto the recording medium (see, for example, Japanese Patent Application Publication No. 2000-222857, pages 4 to 5, and FIGS. 5 through 12).

However, when a label made of a specific material is adhered onto, for example, a CD-R, if an adhesive is applied to the entire surface of the label surface (the surface on the side opposite the side on which data is recorded), under an environment in which the temperature fluctuates widely, such as inside a car, due to so-called bi-metal effects, the CD-R may become bent or deformed by, for example, 1.5° which exceeds the permissible range of skew of ±0.6°, and data may become unreadable, thus presenting a technical problem.

In the technique disclosed in Japanese Patent Application Publication No. 2000-222857 mentioned above, there is not disclosed any effective technique for preventing bending or deformation caused by temperature variation and which exceeds the permissible range of skew.

SUMMARY OF THE INVENTION

Thus, the present invention is made in view of such a technical problem, and seeks to provide an information recording medium from which data can be read reliably even if a label is adhered.

An information recording medium related to an embodiment of the present invention has a label partially attached to an information recording member in which an information recording layer is formed on a substrate. Thus, it becomes possible to read data reliably without being affected by temperature fluctuation even if a label is adhered onto the information recording medium.

In addition, an information recording medium related to an embodiment of the present invention may have a label adhered onto an information recording member, in which an information recording layer is formed on a substrate, with a plurality of isolated adhesive layers arranged on its sheet-like base material. In addition, there may be provided a plurality of protruding sections on the information recording layer side of the information recording member, and a plurality of holes corresponding to the protruding sections may be formed in the label. At least one of the holes may be formed in an elongate form. Further, each of the adhesive layers may be formed so as to enclose a corresponding hole. In addition, the sheet-like base material of the label may be formed of a material having a thermal expansion coefficient that is substantially similar to that of the substrate.

An information recording medium related to an embodiment of the present invention may have a label attached to an information recording member, in which an information recording layer is formed on a substrate and a plurality of protruding sections are arranged on the information recording layer side, by having a plurality of holes that are formed on the sheet-like base material of the label corresponding to the protruding sections engaged with the protruding sections.

A label related to an embodiment of the present invention for an information recording medium may include a sheet-like base material, and a plurality of isolated adhesive layers arranged on the sheet-like base material. Further, the adhesive layers may be formed in the shape of a circle, an ellipse, or a polygon. Alternatively, the adhesive layers may be formed in a shape in which a plurality of lines is combined, and further, they may be formed in the shape of a ring.

A method, related to an embodiment of the present invention, of adhering a label for an information recording medium may include the steps of engaging holes formed in a sheet-like base material of a label that has a plurality of isolated adhesive layers arranged on the sheet-like base material with a plurality of protruding sections, to which the holes formed in the base material correspond, arranged on an information recording member, in which an information recording layer is formed on a transparent substrate, on the side of the information recording layer, while the adhesive layers are made to face the information recording layer; and bringing the adhesive layers of the label into close contact with the information recording layer side of the information recording member.

BRIEF DESCRIPTION OF THE DRAWINGS

FIG. 1 is a plan view of the CD-R and FIG. 1B is a sectional view taken along line XX in FIG. 1A;

FIG. 3A is a plan view of the label, and FIG. 3B is a sectional view taken along line YY in FIG. 3A;

FIG. 4 is a chart comparing the deformation of CD-Rs when the temperature is varied;

FIG. 9A is a plan view of the CD-R and FIG. 9B is a sectional view taken along line ZZ in FIG. 9A.

DESCRIPTION OF THE PREFERRED EMBODIMENTS

The present invention will be described below in detail with respect to the embodiments illustrated in the appended drawings.

Embodiment 1

Figure 1A:
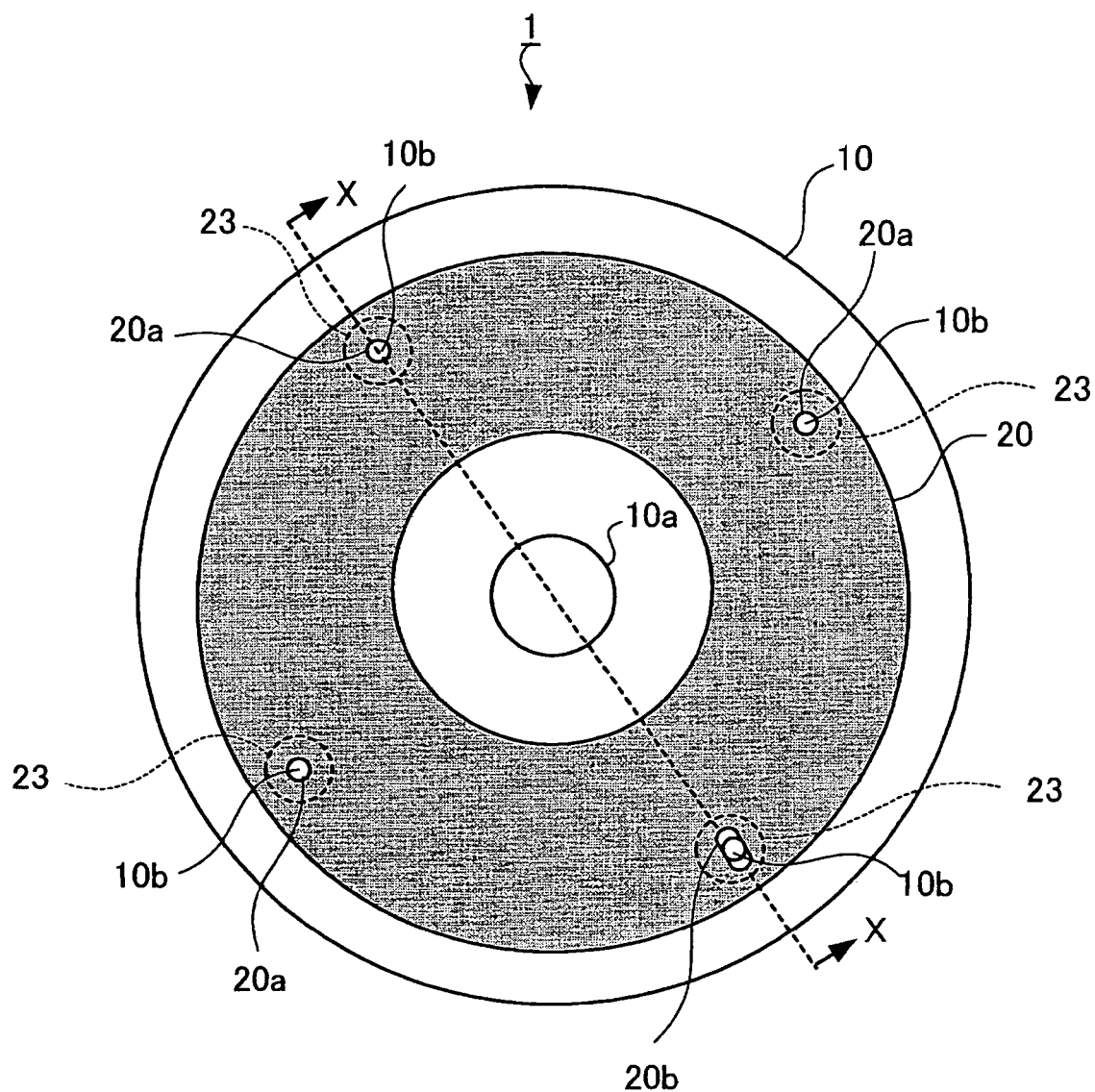
FIGS. 1A and 1B illustrate a CD-R, where
Figure 1B:
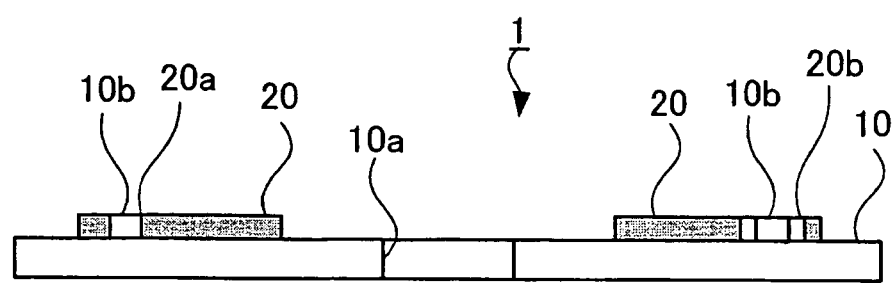

FIGS. 1A and 1B illustrate a CD-R 1 which is the information recording medium in the present embodiment. FIG. 1A is a plan view and FIG. 1B is a sectional view taken along line XX in FIG. 1A. The CD-R 1 is comprised of a CD-R body 10 and a label 20, and the label 20 is adhered to the CD-R body 10 on the surface opposite the side on or from which data is recorded or read. This surface, to which the label 10 is adhered, will be referred to as the label surface.

Figure 2:
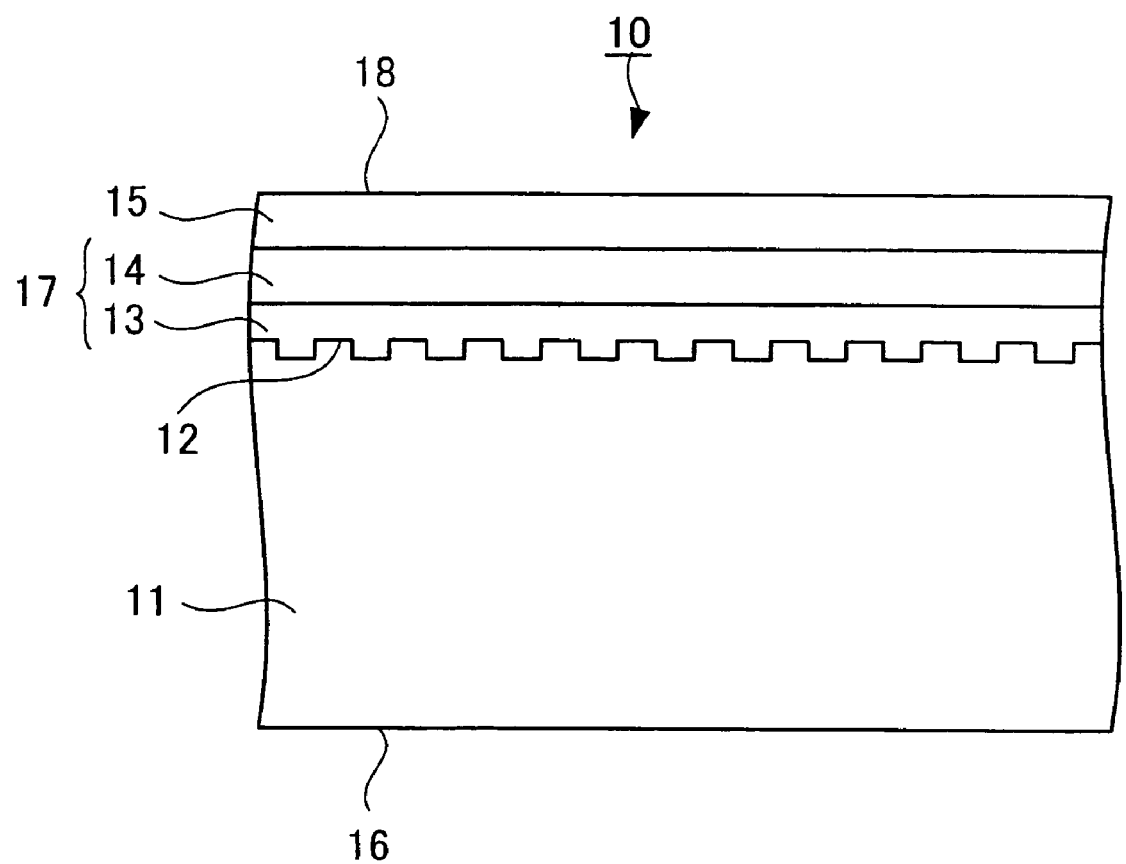
FIG. 2 is a sectional view of a CD-R.

FIG. 2 is a sectional view of the CD-R body 10. The CD-R body 10 is comprised of a transparent resin substrate 11 on which guide grooves 12 are formed on one side, a dye recording layer 13 formed so as to cover the guide grooves 12, a metal reflective layer 14 formed on the dye recording layer 13, a top coat layer 15 formed of UV resin (ultra violet ray curable resin) on the metal reflective layer 14. The dye recording layer 13 and the metal reflective layer 14 constitute an information recording layer 17 on and from which data is written and read.

The transparent resin substrate 11 is formed of polycarbonate resin and the like in the shape of a disc of a diameter of 120 mm and a thickness of 1.2 mm. A chucking hole 10a of a diameter of 15 mm is formed in the center so that it may be engaged with the disc driving shaft of a recording/reproducing apparatus. On the surface of the transparent resin substrate 11 on the side on which the guide grooves 12 are formed are provided four protruding sections 10b (see FIG. 1A) for positioning the label 20, and the protruding sections 10b are arranged at intervals of 90° within an area that falls inside the circumference of the label 20. The height of the protruding section 10b is approximately equal to or slightly greater than the thickness of the label 20.

The guide grooves 12 provided on one of the surfaces of the transparent resin substrate 11 are formed with a pitch of approximately 1.6 µm, and are used to guide the laser beam in writing or reading data, to measure time, and for various other controls.

The dye recording layer 13 is so formed that it reaches 300° C. locally when an intense laser beam (an intensity of several-ten fold as compared to when reading) is irradiated, the dye in the dye recording layer 13 reacts chemically so that portions corresponding to pits and lands are written.

The metal reflective layer 14 is formed of aluminum and the like, and reflects the laser beam. The top coat layer 15 is a protective layer of a thickness of 20 µm, and is formed by first applying a UV resin solution on the metal reflective layer 14 by the so-called spin coat method in which the UV resin solution is dripped onto the metal reflective layer 14 and made to spread by centrifugal force, and then curing it by irradiating UV rays.

Recording information to the CD-R body 10 is carried out by irradiating a laser beam from the side of a surface 16 (laser irradiated surface) on the side opposite a label surface 18 provided on the side of the transparent resin substrate 11 on which the guide grooves 12 are provided, and focusing the laser beam on the dye recording layer 13 to form pits. The pit width is 0.5 µm, and its length is approximately 0.83 µm to 3.56 µm.

On the other hand, information recorded on the CD-R body 10 is read by irradiating a laser beam for reading onto the dye recording layer 13 from the laser irradiated surface 16 side of the transparent resin substrate 11, and detecting the change in reflectance of pits and lands.

Figure 3A:
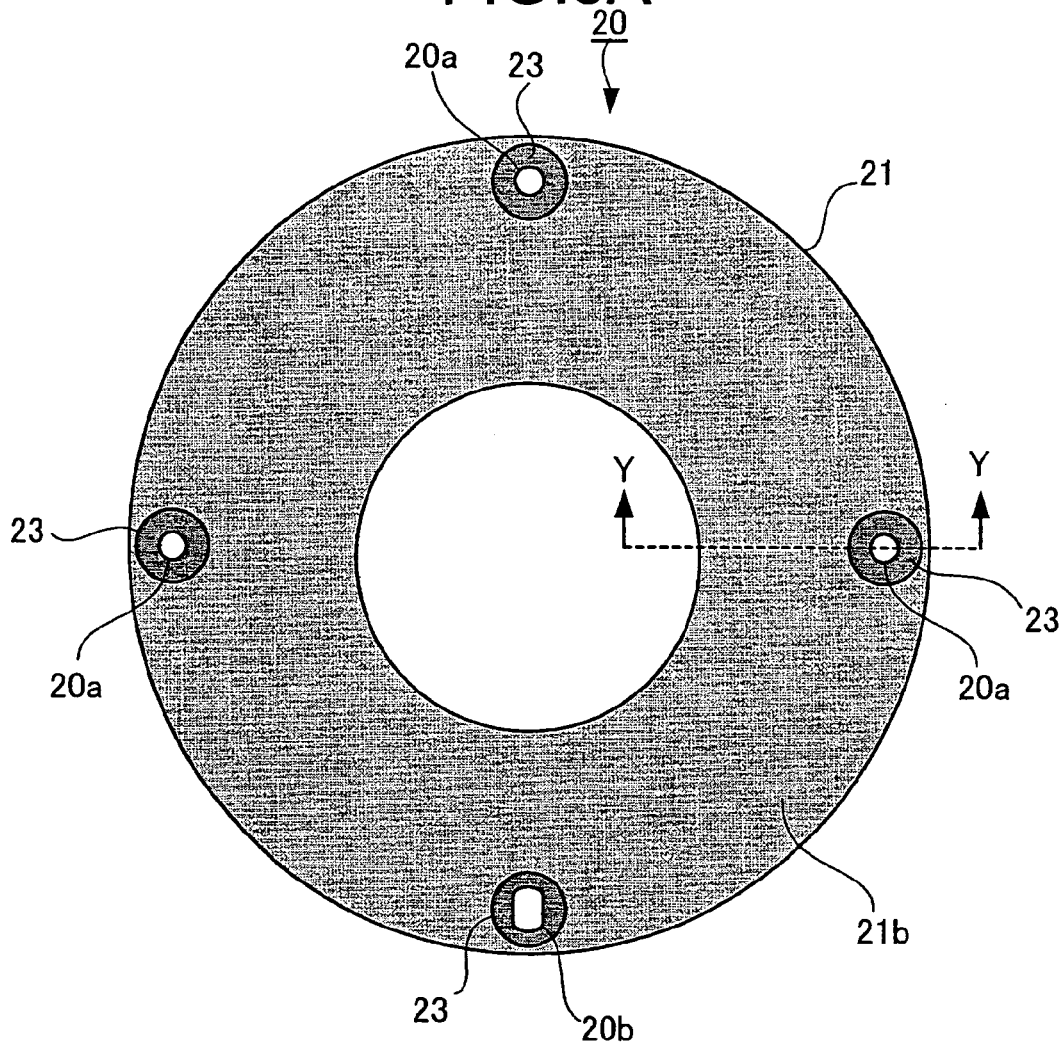
FIGS. 3A and 3B illustrate a label, where
Figure 3B:
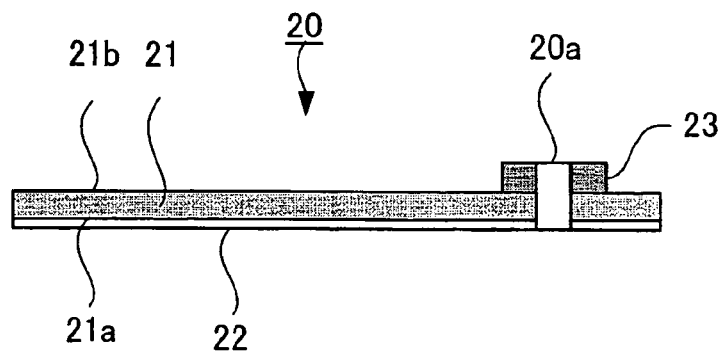

Next, the label 20 will be described. FIGS. 3A and 3B illustrate the structure of the label 20, where FIG. 3A is a plan view of the label 20, and FIG. 3B is a sectional view taken along line YY in FIG. 3A. As shown in FIGS. 3A and 3B, the label 20 is comprised of a sheet-like base material 21, a record receiving layer (ink receiving layer) 22 provided on one surface (print surface) 21a of the base material 21, and a plurality of isolated adhesive layers 23 provided on the other surface (adhesive surface) 21b of the base material 21.

The sheet-like base material 21 has a doughnut shape with an outer diameter of 116 to 118 mm, and an inner diameter of 24 to 41 mm, and it has a thickness of 80 to 120 µm. Paper may be used as the material for the base material 21. In addition, synthetic papers using thermoplastic synthetic resin films such as PET (polyethylene terephthalate), PE (polyethylene), PP (polypropylene), PC (polycarbonate) and the like, and thermoplastic synthetic resins such as polyolefin and the like, laminate films in which a thermoplastic synthetic resin film mentioned above and a metal foil such as aluminum are laminated, and the like may be used as well.

The sheet-like base material 21 has, in a manner matching the four protruding sections 10b provided on the transparent resin substrate 11 of the CD-R body 10, three circular holes 20a and an elongate hole 20b. The label 20 is placed in position by engaging the circular holes 20a and the elongate hole 20b with the protruding sections 10b on the CD-R body 10. The elongate hole 20b is provided to compensate for dimensional irregularities.

The record receiving layer 22 is formed by printing a foundation ink on the print surface 21a of the sheet-like base material 21 to a thickness of 7 µm through gravure printing, and then curing it by irradiating UV rays. Thus, in cases where a material that is poor in water absorbance, such as a thermoplastic synthetic resin film and the like, is used for the sheet-like base material 21, ink and the like sets better when printed thereon.

The foundation ink has mixed therein 38 weight parts of urethane acrylate oligomer as a base resin, 25 weight parts of reactive acrylate as a reactive diluent, 3 weight parts of a benzoin ether agent as a photo polymerization initiator, 1 weight part of a thickening agent, and 1 weight part of a ketone as a solvent. By mixing various known additives, such as a leveling agent, a plasticizer, an antioxidant, an antifoaming agent, a surface tension adjusting agent, a preservative, a viscosity stabilizer, a pH adjusting agent and the like, into the foundation ink, the stability and printability of the print ink can be improved.

As an alternative to the foundation ink described above, in UV curable foundation inks and dried solvent-based inks, there are mixed, as hydrophilic agents, polyvinyl alcohol, polyvinyl methyl ether, carboxy vinyl polymer, cellulose derivatives such as methyl cellulose, carboxy methyl cellulose and the like, poly vinyl pyrrolidone, morpholine and the like. Thus, the recordability (ink reception) of the sheet-like base material 21 can be improved. In addition, inorganic spherical particles such as calcium carbonate, titanium oxide, calcium sulfate, barium sulfate, clay, aluminum silicate, alumina, zinc oxide and the like, scale-shaped fine particles, and organic particles such as acryl, polystyrene, polymethyl methacrylate, urethane, nylon and the like may also be used. Thus, slipping upon writing with a pen, for example, is made less likely, and writability can be improved.

In addition, in order to improve the adhesion between the record receiving layer 22 and the sheet-like base material 21, corona discharge treatment may be performed in advance on the print surface 21a of the sheet-like base material 21, or a base coat layer may be provided on the print surface 21a. For the base coat layer, a synthetic resin used for anchor coating, gelatin, nitrocellulose and the like may be used, and the amount of base coating applied should preferably be 0.2 to 2 μm from the view point of adhesiveness and manufacturing cost.

A plurality of isolated adhesive layers 23 is provided on the adhesive surface 21b of the sheet-like base material 21 as shown in FIG. 3A. In the present embodiment, the adhesive layers 23 are formed so as to enclose the circular holes 20a and the elongate hole 20b, which are formed with intervals of 90° therebetween so as to correspond to the protruding sections 10b of the CD-R body 10, and the adhesive layers 23 are formed in a circular shape with, for example, a diameter of 10 mm, and a thickness of 90 to 160 μm. Because the adhesive layers 23 are each provided to enclose the circular holes 20a and the elongate hole 20b, by simply applying pressure around the circular holes 20a and the elongate hole 20b in engaging the circular holes 20a and the elongate hole 20b with the protruding sections 10b of the CD-R body 10, it is possible to adhere the label 20.

Adhesives that may be used for the adhesive layers 23 include acrylic and rubber adhesives. For example, some appropriate amount of a rosin derivative and the like may be added, as an adhesion enhancing agent, to an acrylic ester resin, a polyvinyl ether resin, styrene butadiene rubber, or butadiene acrylonitrile rubber, and a softener, a filler, an antioxidant and the like may also be added as deemed appropriate.

Similarly, as a UV curable adhesive, an adhesive that is obtained by mixing a polymerization inhibitor, and, for example, an acrylic antifoaming agent not containing any of the following may be used: an oligourethane acrylate, an ester monomer, an epoxy monomer, an acetophenone photo polymerization initiator, acyl phosphine oxide, an elastomer, and silicon.

The CD-R body 10 and the label 20 are partially adhered to each other by way of the plurality of isolated adhesive layers 23 by making the adhesive surface 21b of the label 20 face the label surface 18 of the CD-R body 10 (see FIG. 2).

Taking a case where, for example, the CD-R body 10 and the label 20 are adhered to each other at 25° C. as a reference, when the temperature changes from this state, because the coefficient of expansion differs between the CD-R body 10 and the label 20, there is generated a difference in radial length between the CD-R body 10 and the label 20, contraction or expansion is experienced at the surface of adhesion between the CD-R body 10 and the label 20, which causes the CD-R 1 to bend or become deformed. However, in the CD-R 1 related to the present embodiment, the adhesive layers 23 are provided only around the three circular holes 20a and the elongate hole 20b that are provided at intervals of 90°. In other words, the adhesive layers 23 are not provided over the entire surface of the adhesive surface 21b, but instead on isolated spots in a partial manner.

Thus, because the force at work at the surface of adhesion between the CD-R body 10 and the label 20 affects only the areas where the adhesive layers 23 are provided, in the present embodiment, the CD-R body 10 only experiences physical force from the four adhesive layers 23. Since the area covered by the four adhesive layers 23 is considerably smaller in relation to the area of the CD-R body 10, the force experienced by the CD-R body 10 due to the difference in expansion coefficients between the CD-R body 10 and the label 20 is weak in relative terms. In other words, the resilience of the transparent resin substrate 11 of the CD-R body 10 is greater relative to the force caused by the difference in expansion coefficients between the CD-R body 10 and the label 20 due to temperature changes, and it is thus possible to suppress the bending or deformation of the CD-R body 10.

FIG. 4 compares the deformation (bending) of the CD-R 1 when the temperature is varied. The bend in the CD-R 1 is expressed with a value that is obtained by placing the CD-R 1 on a horizontal plane, irradiating light on the CD-R 1 in a perpendicular manner, and dividing the angle between the irradiated beam and the reflected beam by two (i.e. skew angle). The reference conditions are as follows: paper is used for the label 20, and the CD-R body 10 and the label 20 are adhered at 25° C. As shown in FIG. 4, when an adhesive is applied on the entire surface of the label 20, the skew angle falls outside the permissible range, within which data can be written and read to and from the CD-R 1, of ±0.6° at temperatures of 0° C. and 45° C. by a considerable amount, but in the present embodiment where the adhesive layers 23 are provided at four points only, it is possible to keep the skew angle within the permissible range of ±0.6°.

Next, another example for providing the adhesive layers 23 on the base material 21 will be described.

Figure 5:
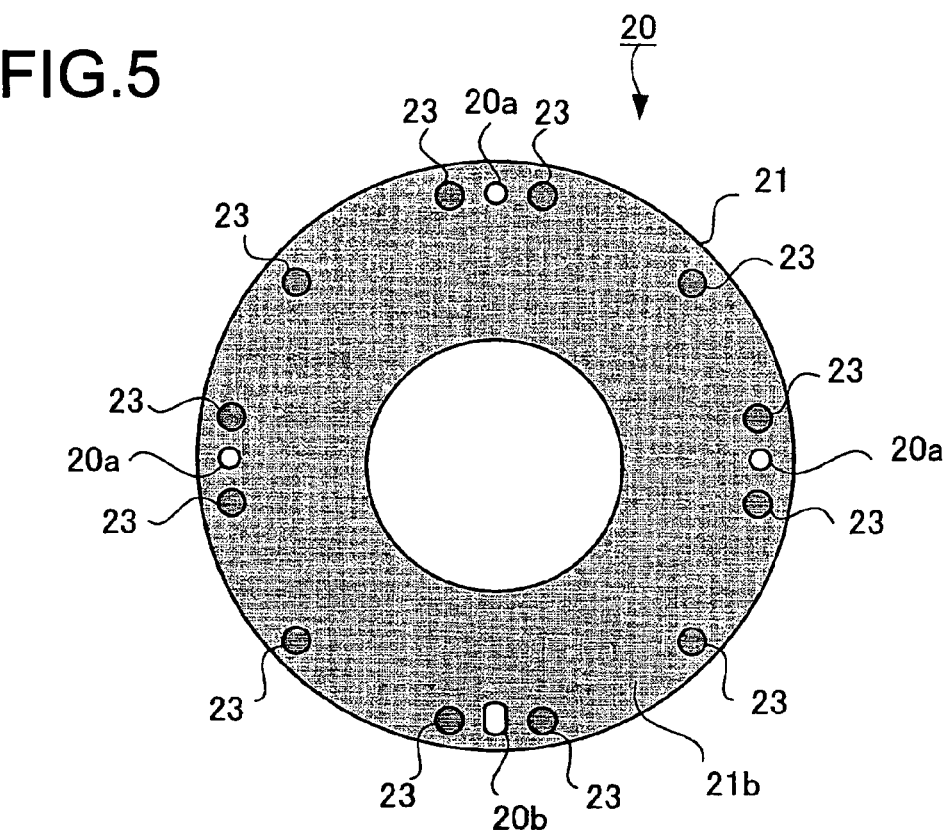
FIG. 5 illustrates an alternate embodiment of providing adhesive layers on the base material.

In FIG. 5, twelve adhesive layers 23, each having a diameter of approximately 5 mm, are provided close to the outer circumference of the base material 21 and along the circumference of a concentric circle. Thus, because the number of adhesive surfaces between the CD-R body 10 and the label 20 increases, the label 20 can be prevented from become loose. On the other hand, although the number of areas that experience force due to the difference in expansion coefficients between the CD-R 10 and the label 20 caused by temperature changes increases, because the total area of the adhesive surfaces is small, the force experienced by the transparent resin substrate 11 of the CD-R body 10 as a whole does not exceed the resilience of the transparent resin substrate 11, and the bending or deformation of the CD-R body 10 can be suppressed. The shape of the adhesive layers 23 is not limited to circular shapes, and they may take on elliptical shapes, and polygonal shapes, such as triangles, as well.

Figure 6:
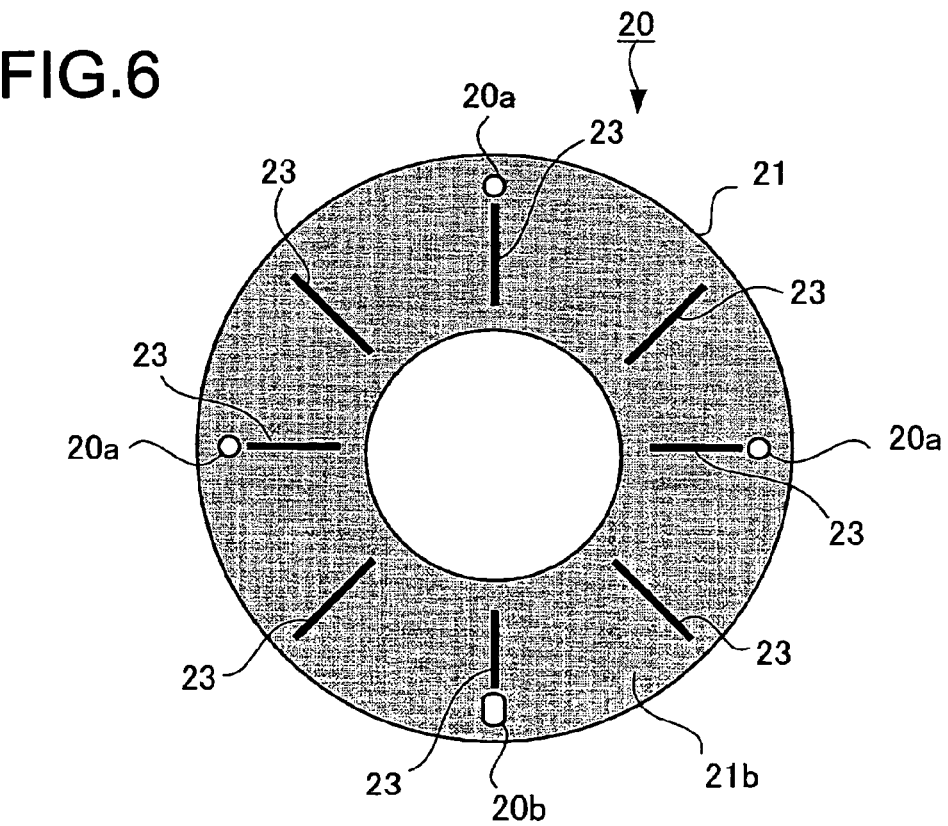
FIG. 6 illustrates an alternate embodiment of providing adhesive layers on the base material.

FIG. 6 shows another example where eight adhesive layers 23 are each formed in the shape of a rectangle having a width of 2 mm and a length of 30 mm, and are placed at regular intervals so as to have each extend in the radial direction from the center of the base material 21. Through such an arrangement, too, because the total area of the adhesive surface is small, the force experienced by the transparent resin substrate 11 of the CD-R body 10 does not exceed the resilience of the transparent resin substrate 11, and the bending or deformation of the CD-R body 10 can be suppressed.

Figure 7:
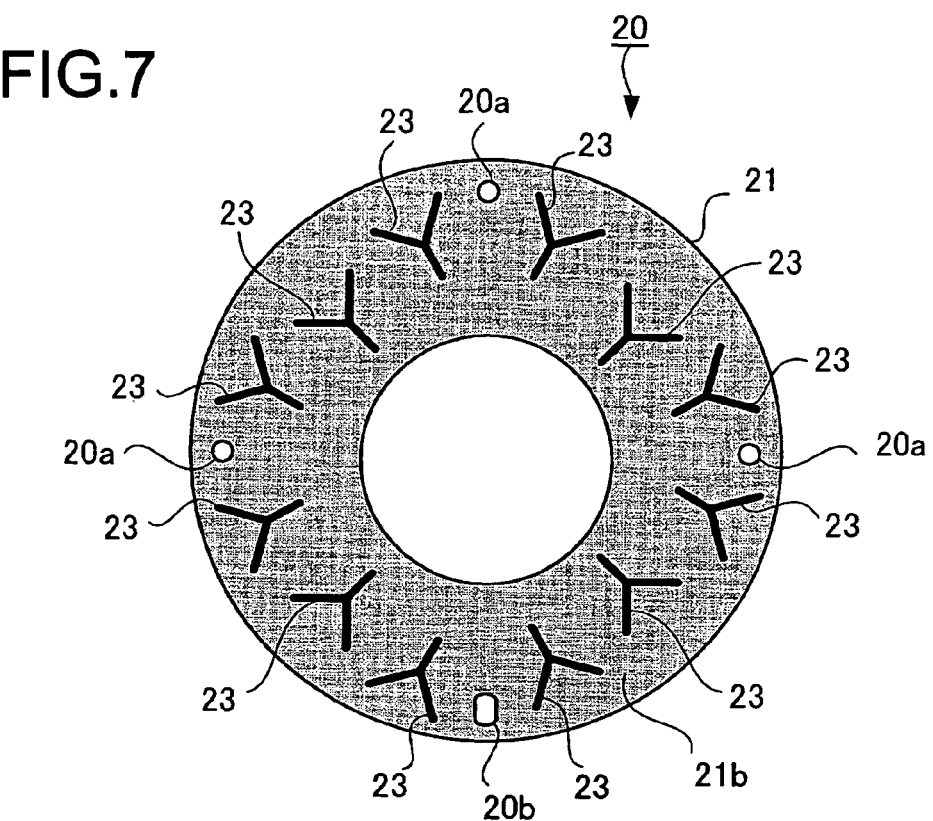
FIG. 7 illustrates an alternate embodiment of providing adhesive layers on the base material.

FIG. 7 shows an example in which twelve adhesive layers 23 are each formed in a Y-shape having a line width of approximately 1 to 1.5 mm, and are arranged so as to extend in the radial direction from the center of the base material 21 with regular intervals between each. In order to prevent the label 20 from becoming loose, the Y-shaped adhesive layers 23 are arranged in such a manner that the distance between the center of the base material 21 and the adhesive layers 23 is alternated so that they are positioned evenly over the entire surface of the base material 21. Thus, the label 20 can be prevented from becoming loose, and since the total area of the adhesion surface is small, the bending or deformation of the CD-R body 10 can be suppressed. The shape of the adhesive layers 23 is not limited to the Y-shape mentioned above, and shapes in which a plurality of lines are combined such as an inverse Y, an X or a T may also be adopted, and a combination of a plurality of shapes may also be used.

Figure 8:
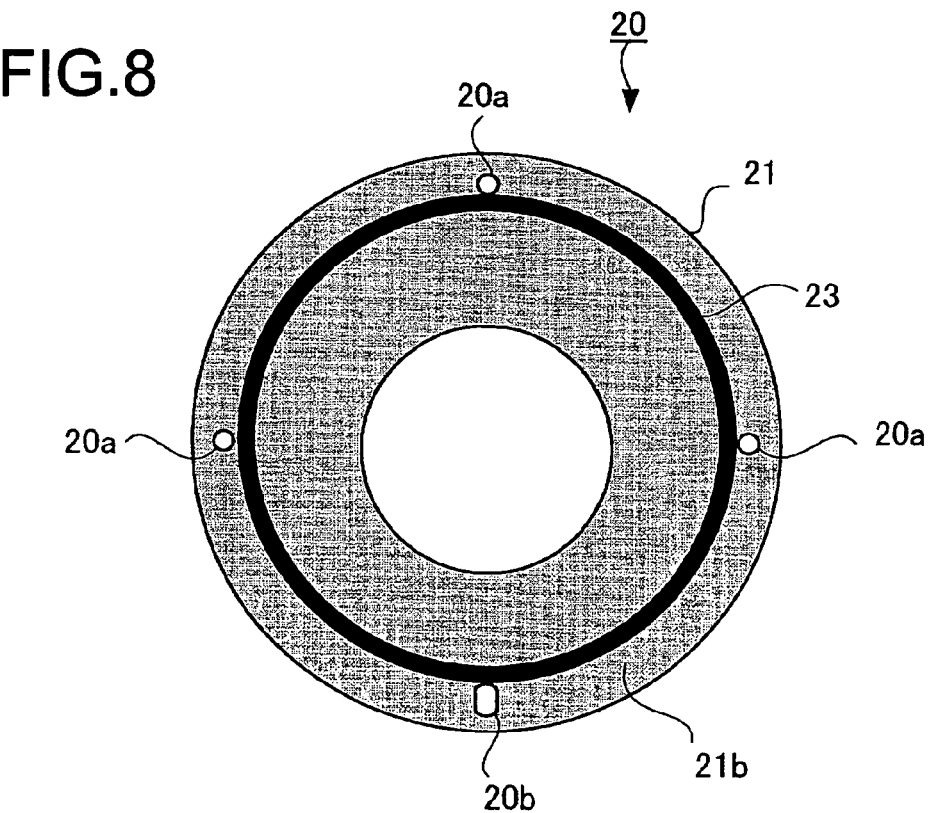
FIG. 8 illustrates an alternate embodiment of providing adhesive layers on the base material.

FIG. 8 shows an example in which one adhesive layer 23 is formed in the shape of a ring having a line width of approximately 2 mm. Through such an arrangement, too, because the force due to the difference in expansion coefficients between the CD-R body 10 and the label 20 is at work only at the area covered by the ring, as a whole it never exceeds the resilience of the transparent resin substrate of the CD-R body 10, and it is thus possible to suppress the bending or deformation of the CD-R body 10. It is preferable to position the ring-shaped adhesive layer 23 towards the center of the base material 21 since expansion is less pronounced and the force due to the difference in expansion coefficients between the CD-R body 10 and the label 20 smaller the closer the ring is to the central axis of the base material 21. In addition, several rings may be provided instead of one, and the line width may be made thicker for the rings closer to the center where expansion is less pronounced, and thinner the closer it gets to the outer circumference of the base material 21.

Next, a method of adhering the label 20 to the CD-R body 10 will be described. As described above, there are provided, at intervals of 90° and within an area that falls within the outer circumference of the label 20, four protruding sections 10b for positioning the label 20. On the other hand, three circular holes 20a and the elongate hole 20b are provided in the base material 21 of the label 20 so as to correspond to the four protruding sections 10b provided on the CD-R body 10. In addition, isolated adhesive layers 23 are provided so as to enclose the three circular holes 20a and the elongate hole 20b on the adhesive surface 21b of the sheet-like base material 21. Further, before the label 20 is adhered to the CD-R body 10, there is a release sheet over the entire surface of the adhesive surface 21b of the sheet-like base material 21 to protect the adhesive layers 23. However, the release sheet may instead be provided so as to cover just the adhesive layers 23.

The release sheet is comprised of a PP film of a thickness of 30 μm, and on the surface that is to be adhered to the adhesive layers 23 is provided, as a release agent and with a thickness of 0.5 to 2 μm, an acrylic resin to which silicon is added. Instead of silicon, a paraffin wax, a synthetic wax, silica and the like may be added to epoxy or polyimide resin and be used as a release agent. The film may also be a thermoplastic synthetic resin such as PE, PP, PET and the like, and the thickness is not necessarily limited to 30 μm, and may be selected as deemed appropriate.

In adhering the label 20 to the CD-R body 10, the release sheet is removed from the label 20. Then, the three circular holes 20a and the elongate hole 20b provided in the label 20 are positioned against the four protruding sections 10b provided on the CD-R body 10, and are engaged therewith. In so doing, because there is provided the elongate hole 20b, even if the holes are not positioned precisely against the protruding section 10b, the holes can be engaged with the protruding sections 10b. Then the plurality of isolated adhesive layers 23 provided on the adhesive surface 21b of the base material 21 is brought into close contact with the CD-R body 10, and the label 20 is adhered to the CD-R body 10. Thus, the label 20 can be adhered to the CD-R body 10 with more accuracy, while at the same time suppressing the bending or deformation of the CD-R 10, caused by changes in temperature, to which the label 20 is adhered.

In the present embodiment, the label 20 is positioned relative to the CD-R body 10 by engaging the three circular holes 20a and the elongate hole 20b with the four protruding sections 10b of the CD-R body 10. However, if the label 20 can be positioned relative to the CD-R body 10 through some other method, there is no need to provide the protruding sections 10b of the CD-R body 10 nor the three circular holes 20a and the elongate hole 20b.

In addition, by using, for the sheet-like base material 21, a material having a thermal expansion coefficient that approximates that of the transparent resin substrate 11 of the CD-R body 10, the difference in the extent of expansion between the CD-R body 10 and the label 20 is reduced, thereby suppressing the bending or deformation of the CD-R body 10. For example, by using the same material for both the sheet-like base material 21 and the transparent resin substrate 11, such as polycarbonate in the present embodiment, the bending or deformation of the CD-R body 10 can be suppressed.

Thus, according to the present embodiment, since a plurality of isolated adhesive layers 23 are provided, the force experienced by the CD-R body 10 due to the difference in expansion coefficients between the CD-R body 10 and the label 20 due to changes in temperature can be mitigated, and the bending or deformation of the CD-R body can be suppressed. Therefore, it is possible to read data from the CD-R 1 in a stable manner.

In addition, because the adhesive layers 23 are provided as isolated spots, the label 20 can be adhered to the CD-R body 10 with a smaller amount of adhesive. Further, the label 20 can be removed from the CD-R 10 with greater ease.

Embodiment 2

In embodiment 1 above, an information recording medium (CD-R) 1 in which the label 20 is partially adhered to the CD-R body 10 by way of the isolated adhesive layers 23 provided on the sheet-like base material 21 is described. In the present embodiment, an information recording medium (CD-R) 2 in which a label 20 is partially attached to a CD-R body 10, on which a plurality of protruding sections are provided, by having a plurality of holes, which are formed in a sheet-like base material of the label 20 so as to correspond to the plurality of protruding sections of the CD-R body 10, engaged with the plurality of protruding sections. For similar components and features found in embodiment 1, the same or similar reference numerals will be used, and a detailed description thereof will be omitted.

Figure 9A:
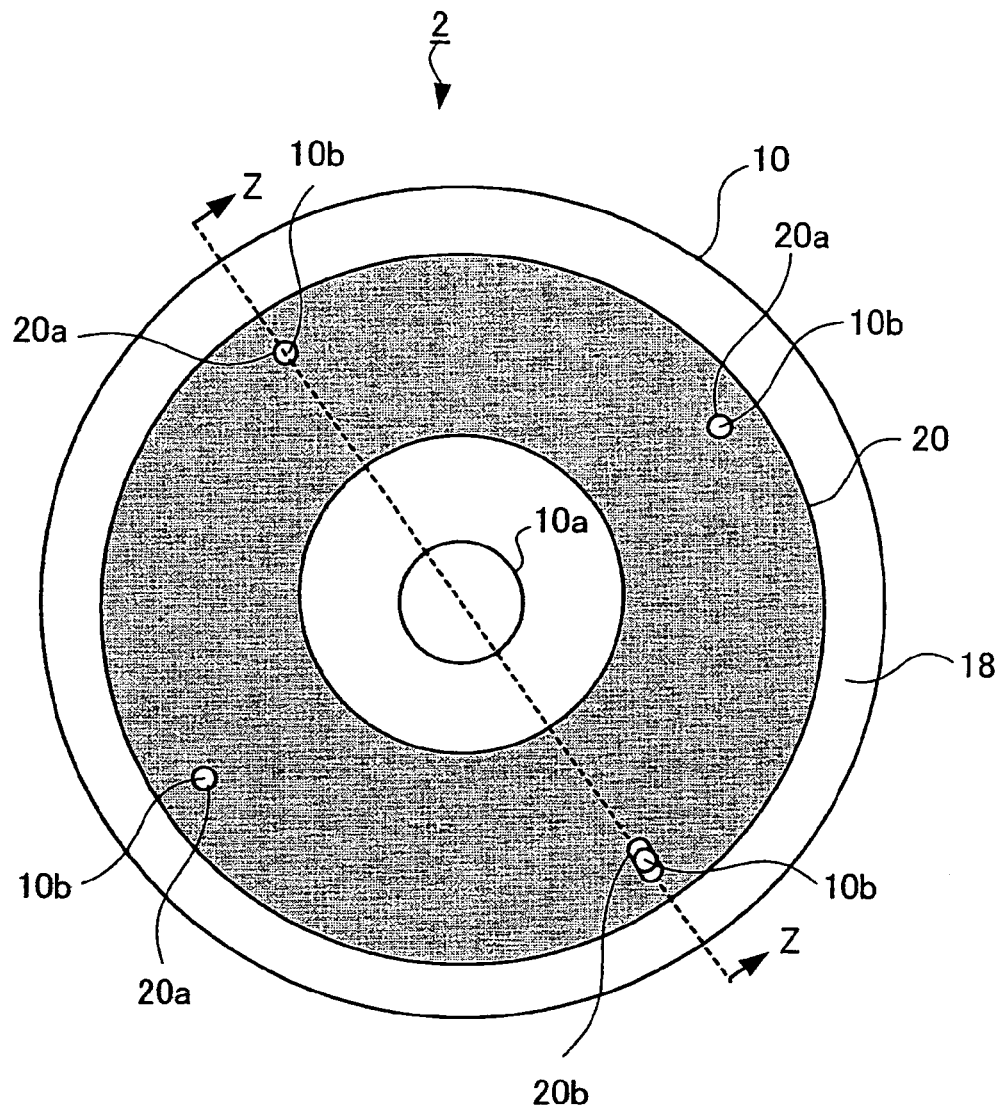
FIGS. 9A and 9B illustrate a CD-R, where
Figure 9B:
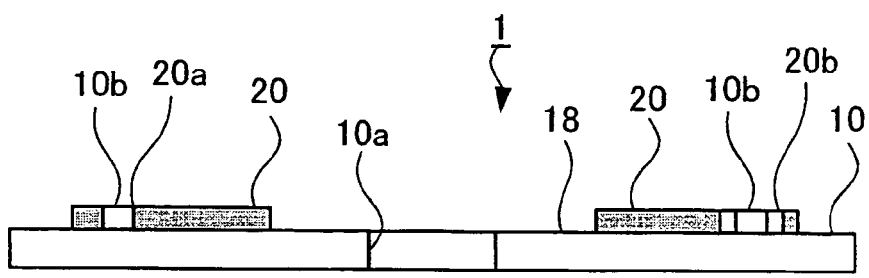

FIGS. 9A and 9B show the CD-R 2 as the information recording medium in the present embodiment. FIG. 9A is a plan view of the CD-R 2, and FIG. 9B is a sectional view taken along line ZZ in FIG. 9A. The CD-R 2 is comprised of the CD-R body 10 and the label 20, and the label 20 is attached to the surface of the CD-R 10 that is opposite the surface to or from which data is written or read. This surface to which the label 20 is attached will be referred to as the label surface 18.

On the label surface 18 of the CD-R body 10 are provided four protruding sections 10b, which are used in attaching the label 20, at intervals of 90° within an area that falls inside the outer circumference of the label 20. The height of the protruding sections 10b may be similar to or slightly greater than the thickness of the label 20.

On the other hand, on the label 20 are provided circular holes 20a and an elongate hole 20b at intervals of 90° so as to correspond to the protruding sections 10b of the CD-R body 10. The diameter of the circular holes 20a and the width of the elongate hole 20b are slightly smaller than the diameter of the protruding sections 10b.

The three circular holes 20a and the elongate hole 20b formed in the label 20 are engaged with the corresponding four protruding sections 10b provided on the CD-R body 10, and the CD-R body 10 and the label 20 are thereby attached. Since the diameter of the circular holes 20a and the width of the elongate hole 20b are slightly smaller than the diameter of the protruding sections 10b, the label 20 is fixed onto the CD-R body 10 by having them engaged.

It is to be noted that the number, position, shape and size of the protruding sections 10b, the circular holes 20a and the elongate hole 20b are not limited to those of the present embodiment, and that they may be varied as deemed fit.

Thus, in the present embodiment, by partially attaching the label 20 to the CD-R body 10 by engaging the circular holes 20a and the elongate hole 20b of the label 20 with the protruding sections 10b of the CD-R body 10, the force experienced by the CD-R body 10 due to the difference in expansion coefficients between the CD-R body 10 and the label 20 stemming from changes in temperature can be mitigated as in embodiment 1, and the bending or deformation of the CD-R body 10 can be suppressed. Therefore, it becomes possible to read data from the CD-R 2 stably. In addition, because all is done is engage the protruding sections 10b with the circular holes 20a and the elongate hole 20b, the label 20 can be removed from the CD-R body 10 with ease.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An information recording medium, comprising:
   an information recording member having an information recording layer and a plurality of protruding sections provided on a side thereof opposite to a data writing/reading side of said information recording layer; and
   a label including a sheet-shaped base material, a plurality of isolated adhesive layers, and a plurality of holes provided on said sheet-shaped base material, wherein said plurality of holes interact with said plurality of protruding sections, and wherein said label is partially attached to said information recording member by way of said plurality of adhesive layers.

2. The information recording medium according to claim 1, wherein at least one of said plurality of holes is an elongate hole.

3. The information recording medium according to claim 1, wherein each of said plurality of adhesive layers is arranged so as to enclose each of said holes.

4. The information recording medium according to claim 1, wherein said sheet-shaped base material of said label is formed of a material having a thermal expansion coefficient that is substantially equal to a thermal expansion coefficient of a substrate on which said information recording layer is formed.

5. An information recording medium, comprising:
   an information recording medium having an information recording layer formed on a substrate and a plurality of protruding sections formed on a label surface of the said information recording layer; and
   a label including a sheet-shaped base material and a plurality of holes formed in said sheet-shaped base material arranged to correspond to said protruding sections, wherein
   said sheet is attached to said label surface of said information recording member only by said holes being engaged with said protruding sections.

6. A label for adherence to an information recording medium the label, comprising:
   a sheet-shaped base material; and
   a plurality of holes and a plurality of isolated adhesive layers provided on said sheet-shaped base material.

7. The label according to claim 6, wherein said plurality of isolated adhesive layers each have one of a circular shape, an elliptical shape, and a polygonal shape.

8. The label according to claim 6, wherein said plurality of isolated adhesive layers have a shape in which a plurality of lines are combined.

9. The label according to claim 6, further comprising a release sheet adhered to said plurality of isolated adhesive layers.

10. A label for adherence to an information recording medium, comprising:
    a sheet-shaped base material; and
    a ring-shaped adhesive layer provided on said sheet-shaped base material.

11. A method of adhering a label to an information recording medium, comprising the steps of:
    engaging a plurality of protruding sections provided on an information recording member, in which an information recording layer is formed on a transparent substrate, with a plurality of holes formed in a sheet-shaped base material of a label so as to interact with said protruding sections, wherein said protruding sections are provided on a label surface of said information recording layer, said sheet-shaped based material of said label is provided with a plurality of isolated adhesive layer locations, and said plurality of adhesive layer locations face said label surface of said information recording layer upon engaging said holes with said protruding sections; and
    bringing said plurality of adhesive layer locations of said label into contact with said information recording member on the label surface of said information recording layer.

* * * * *